United States Patent
Guevel et al.

(10) Patent No.: US 10,738,637 B2
(45) Date of Patent: Aug. 11, 2020

(54) AIRFLOW DEFLECTOR AND ASSEMBLY

(71) Applicant: United Technologies Corporation, Farmington, CT (US)

(72) Inventors: Edward Guevel, West Hartford, CT (US); Rebecca R. Dunnigan, Sturbridge, MA (US); Mark W. Colebrook, Glastonbury, CT (US); Austin R. O'Mara, Somers, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 224 days.

(21) Appl. No.: 15/852,483

(22) Filed: Dec. 22, 2017

(65) Prior Publication Data

US 2019/0195077 A1 Jun. 27, 2019

(51) Int. Cl.
| | |
|---|---|
| F01D 9/06 | (2006.01) |
| F02C 7/18 | (2006.01) |
| F23R 3/06 | (2006.01) |
| F23R 3/00 | (2006.01) |
| F23R 3/16 | (2006.01) |

(52) U.S. Cl.
CPC ............ *F01D 9/065* (2013.01); *F02C 7/18* (2013.01); *F23R 3/002* (2013.01); *F23R 3/06* (2013.01); *F23R 3/16* (2013.01); *F05D 2210/40* (2013.01); *F05D 2220/32* (2013.01); *F05D 2240/12* (2013.01); *F05D 2260/20* (2013.01)

(58) Field of Classification Search
CPC ........ F01D 9/065; F02C 7/28; F05D 2210/40; F05D 2220/32; F05D 2240/12; F05D 2260/20; F23R 3/16; F23R 3/002; F23R 2/06; F23R 2900/03042

USPC ........................................................ 415/116
See application file for complete search history.

(56) References Cited

U.S. PATENT DOCUMENTS

| | | | |
|---|---|---|---|
| 4,191,097 A | 3/1980 | Groen | |
| 5,165,847 A * | 11/1992 | Proctor | ................... F01D 11/08 415/115 |
| 5,239,816 A * | 8/1993 | Holt, III | ................... F01D 9/02 60/39.53 |
| 6,758,732 B1 | 7/2004 | Hilton | |
| 6,929,445 B2 * | 8/2005 | Zatorski | ................... F01D 5/081 415/115 |
| 7,108,479 B2 * | 9/2006 | Beverley | ................. F01D 5/187 415/115 |
| 8,100,633 B2 | 1/2012 | Propheter-Hinckley et al. | |

(Continued)

OTHER PUBLICATIONS

EPO Search Report dated Feb. 4, 2019 for Patent Application No. 18212787.8.

*Primary Examiner* — J. Todd Newton
*Assistant Examiner* — Sabbir Hasan
(74) *Attorney, Agent, or Firm* — Getz Balich LLC

(57) ABSTRACT

An airflow deflector is provided that includes at least one liner attachment flange, a deflector panel, and at least one deflector leg. The at least one liner attachment flange has a liner side surface and an opposing outer surface. The at least one deflector leg extends between and is attached to the at least one liner attachment flange. The at least one deflector leg extends a distance between the deflector panel and the liner attachment flange to maintain the deflector panel a separation distance from the liner attachment flange. The airflow deflector is configured for insertion of the at least one deflector leg and the deflector panel within a liner aperture.

9 Claims, 7 Drawing Sheets

(56) References Cited

U.S. PATENT DOCUMENTS

| | | |
|---|---|---|
| 8,439,636 B1 | 5/2013 | Liang |
| 9,927,123 B2* | 3/2018 | Hagan ..................... F23R 3/26 |
| 2005/0111965 A1 | 5/2005 | Lowe et al. |
| 2008/0206046 A1 | 8/2008 | Razzell et al. |
| 2011/0185740 A1 | 8/2011 | Dierberger et al. |
| 2013/0011238 A1 | 1/2013 | Liang et al. |
| 2014/0130677 A1 | 5/2014 | Guerry et al. |
| 2015/0330238 A1 | 11/2015 | Manzoori et al. |
| 2016/0084164 A1* | 3/2016 | Slavens ..................... F02C 3/04 60/806 |
| 2017/0191664 A1* | 7/2017 | Bennett .................. F23R 3/002 |
| 2018/0010795 A1* | 1/2018 | Nath ...................... F23R 3/002 |
| 2018/0291754 A1* | 10/2018 | McDavid ............... F01D 9/065 |

* cited by examiner

AIRFLOW DEFLECTOR AND ASSEMBLY

BACKGROUND OF THE INVENTION

1. Technical Field

The invention relates generally to gas turbine engines and airflow apertures therein, and more particularly to airflow diffusers for use in gas turbine engines and airflow apertures therein.

2. Background Information

In gas turbine engines and other internal combustion devices it is common to utilize multi-wall liners between two fluids, one fluid at a higher pressure and lower temperature than the other. For example, in a gas turbine engine air may be provided in a first region at a temperature lower and a pressure higher than core gas present in an adjacent second region. Under certain circumstances, it may be desirable to transfer the "cooler" air through the structure (e.g., a liner wall) that separates the first and second region to the second region. In many instances, the cooler air is transferred through a plurality of apertures disposed in the wall, motivated by the difference in air pressure between the two regions.

There can be issues associated with transferring a cooling air in this manner. If there is a significant difference in air temperature in the respective regions and the difference in air pressure is great enough, the streams of cooling air passing between the regions via the wall apertures may create a non-uniform temperature profile within the second region. If the second region is shallow enough, the streams of cooling air may impinge on hardware, thereby potentially creating a non-uniform temperature profile in the affected hardware. The temperature non-uniformity can cause issues such as undesirable thermal distortion.

In many instances, liners having a plurality of cooling apertures are manufactured with all of the cooling apertures having the same diameter. Utilizing the same diameter cooling apertures facilitates the manufacturing process. The uniform aperture diameters may not, however, provide desirable airflow characteristics; e.g., for a given difference in air pressure across the liner some apertures may produce acceptable airflow, and some may produce less than acceptable airflow. Moreover, a liner utilizing cooling apertures with a uniform diameter may inhibit retrofit efforts to improve cooling profiles.

SUMMARY

According to one aspect of the present disclosure, an airflow deflector is provided that includes at least one liner attachment flange, a deflector panel, and at least one deflector leg. The at least one liner attachment flange has a liner side surface and an opposing outer surface. The at least one deflector leg extends between and is attached to the at least one liner attachment flange. The at least one deflector leg extends a distance between the deflector panel and the liner attachment flange to maintain the deflector panel a separation distance from the liner attachment flange. The airflow deflector is configured for insertion of the at least one deflector leg and the deflector panel within a liner aperture.

According to another aspect of the present disclosure, an airflow deflector assembly is provided. The assembly includes an airflow metering panel and an airflow deflector. The metering panel includes a metering orifice. The airflow deflector includes at least one liner attachment flange, a deflector panel, and at least one deflector leg. The at least one liner attachment flange has a liner side surface and an opposing outer surface. The at least one deflector leg extends between and is attached to the at least one liner attachment flange. The airflow deflector assembly is configured for the stacked assembly of the airflow deflector in communication with a liner, including the insertion of the at least one deflector leg and the deflector panel within a liner aperture, and the airflow metering panel in communication with the at least one liner attachment flange with the metering orifice aligned with the liner aperture.

According to another aspect of the present invention, a gas turbine engine is provided that includes a fan section, a compressor section, a turbine section, at least one rotor shaft connecting the compressor and turbine section, a liner separating a first region from a second region, and at least one airflow deflector assembly attached to the liner. The liner includes at least one liner aperture, and has a first surface contiguous with the first region, and a second surface contiguous with the second region. The at least one airflow deflector assembly includes an airflow deflector. The airflow deflector includes at least one liner attachment flange, a deflector panel, and at least one deflector leg. The at least one liner attachment flange has a liner side surface and an opposing outer surface. The at least one deflector leg extends between and is attached to the at least one liner attachment flange. The at least one liner attachment flange is in communication with the first side surface of the liner. The at least one deflector leg extends through the liner aperture, and the deflector panel is disposed within the second region spaced apart from the second side surface of the liner.

According to any embodiment or aspect of the present disclosure, the at least one deflector leg may include a plurality of deflector legs.

According to any embodiment or aspect of the present disclosure, a plurality of deflector legs may be distributed around a periphery of the deflector panel.

According to any embodiment or aspect of the present disclosure, the at least one liner attachment flange may include a central portion, a first portion extending laterally outward from the central portion, and a second portion extending laterally outward from the central portion.

According to any embodiment or aspect of the present disclosure, the central portion may include an airflow aperture.

According to any embodiment or aspect of the present disclosure, the at least one liner attachment flange and the deflector panel may be substantially parallel one another.

According to any embodiment or aspect of the present disclosure, the at least one liner attachment flange and the deflector panel may be non-parallel one another.

According to any embodiment or aspect of the present disclosure, the airflow aperture disposed in the attachment flange may be aligned with the metering orifice in stacked assembly.

According to any embodiment or aspect of the present disclosure, an airflow metering panel may be integrally formed with the airflow deflector, and may be aligned with a liner aperture in stacked assembly.

These above aspects and embodiments will become apparent in light of the detailed description of the invention provided below, and as illustrated in the accompanying drawings.

DETAILED DESCRIPTION

Figure 1:
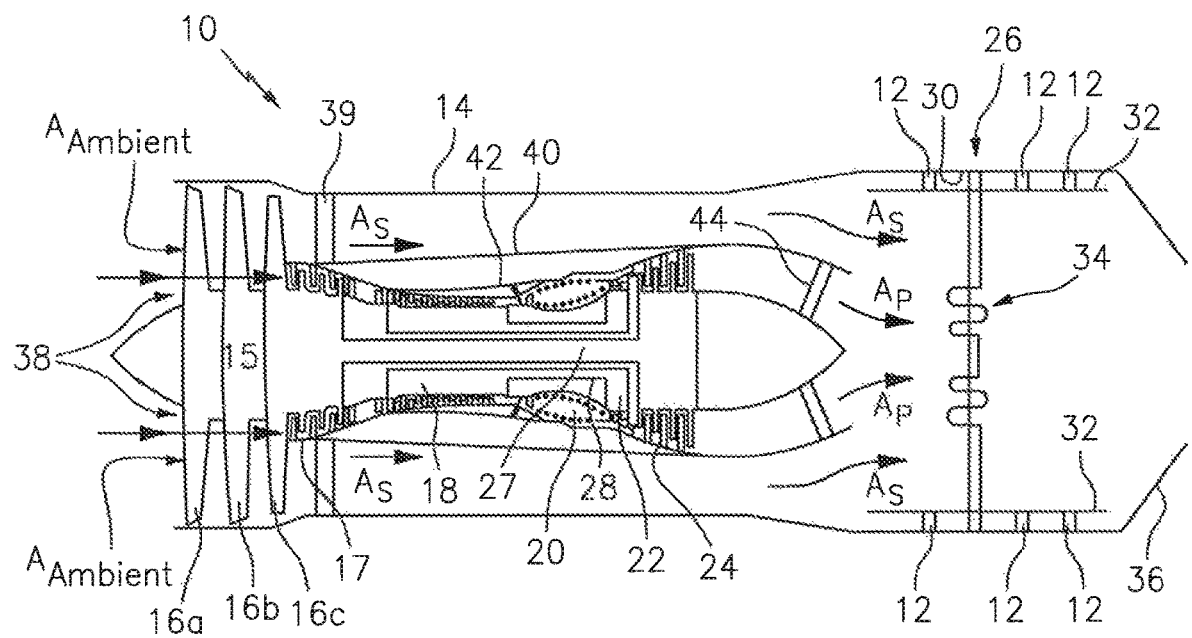
FIG. 1 is a schematic diagram of a dual-spool, low-bypass ratio turbofan engine.

FIG. 1 shows a schematic diagram of dual-spool, low-bypass ratio turbofan engine 10, in which a present disclosure an airflow deflector can be used. In other embodiments, the present disclosure is applicable to other types of gas turbine engines such as high-bypass ratio turbofans including turbofans using fan drive gear systems. A turbofan engine 10 typically includes fan duct 14, drive fan 15 (including stages 16a-16c), low pressure compressor 17, high pressure compressor 18, combustor 20, high pressure turbine 22, low pressure turbine 24 and exhaust system 26. Drive fan 15 and low pressure compressor 17 are driven by low pressure turbine 24 with shaft 27. High pressure compressor 18 is driven by high pressure turbine 22 with shaft 28. High pressure compressor 18, combustor 20, high pressure turbine 22 and shaft 28 comprise the core of turbofan engine 10, which produces the high energy air stream that is ultimately used to drive low pressure turbine 24 and provide high pressure flow to produce thrust via both primary air $A_P$ and secondary air $A_S$. Exhaust system 26 includes exhaust duct 30, exhaust liner 32, augmentation system 34 and exhaust nozzle 36. FIG. 1 diagrammatically shows hangers 12 disposed in multiple circumferential arrays to suspend the exhaust liner 32 within exhaust duct 30.

Ambient air ($A_{Ambient}$) enters engine 10 at inlet 38 through drive fan 15. Drive fan 15 is rotated by low pressure turbine 24 to accelerate ambient air $A_{Ambient}$ thereby producing a major portion of the thrust output of engine 10. Accelerated ambient air $A_{Ambient}$ is divided into two streams of air: primary air $A_P$ and secondary air $A_S$. Secondary air $A_S$, also known as bypass air, passes through fan exit guide vanes 39 and between fan duct 14 and aft duct 40 where it passes on to exhaust system 26. Thus, a principal function of secondary air $A_S$ is the production of thrust from drive fan 15. Secondary air $A_S$ may also be used as a cooling air flow. Primary air $A_P$, also known as core air, is an air flow that is directed first into low pressure compressor 17 and then into high pressure compressor 18 within engine case 42, where it is increased in pressure relative to ambient. Pressurized primary air $A_P$ is then passed into combustor 20 where it is mixed with a fuel supply and ignited to produce high energy gases, as is known in the art. The high energy gasses are used to turn high pressure turbine 22 and low pressure turbine 24. The high pressure turbine 22 drives the high pressure compressor 18 with shaft 28, while the low pressure turbine 24 drives the low pressure compressor 17 and drive fan 15 with shaft 27. Primary air $A_P$ passes into the exhaust system 26 through exit guide vanes 44.

As stated above, gas turbine engines often include a panel, wall or other structure (hereinafter referred to as a "liner 50") separating adjacent regions; e.g., separating a first region ("R1") and a second region ("R2"); e.g., see FIG. 9. The liner 50 may be a one-piece liner structure or it may include a plurality of segments that collectively form the liner structure. The liner 50 has a thickness 52 that extends between a first surface 54 and a second surface 56. To facilitate the description herein, the liner first surface 54 is described herein as contiguous with the first region and the liner second surface 56 is described herein as contiguous with the second region. The present disclosure is not limited to use with a liner 50 having any particular geometric configuration. The liner 50 includes at least one aperture 58 extending through the entirety of the thickness 52 of the liner 50, and typically includes a plurality of apertures 58 extending through the thickness 52 of the liner 50. The liner apertures 58 each extend along an axis "A", and typically the aperture axis is normal to the liner 50 at the point of the liner 50 where the aperture 58 is disposed. The present disclosure is not, however, limited to use with liner apertures 58 having an axis normal to the liner 50. The liner apertures 58 each have a cross-sectional geometry; e.g., circular, or oblong having a first dimension greater than a second dimension, etc. The liner apertures 58 may all have the same cross-sectional geometry or the plurality of liner apertures 58 may have a plurality of different cross-sectional geometries; e.g., one or more first liner apertures each having a circular cross-sectional geometry with a first diameter ("D1"), one or more second liner apertures each having a circular cross-sectional geometry with a second diameter ("D2"), where D1≠D2, one or more third liner apertures each having an oblong cross-sectional geometry, etc.

The present disclosure includes an airflow deflector assembly 60 having an airflow deflector 62. The airflow deflector 62 includes at least one deflector leg 64, at least one liner attachment flange 66, and at least one deflector panel 68. The at least one deflector leg 64 extends between and is attached to the deflector panel 68 and the at least one liner attachment flange 66. The deflector leg(s) 64 extends a distance between the deflector panel 68 and the liner attachment flange 66 to maintain the deflector panel 68 a separation distance from the liner attachment flange 66.

Figure 2:
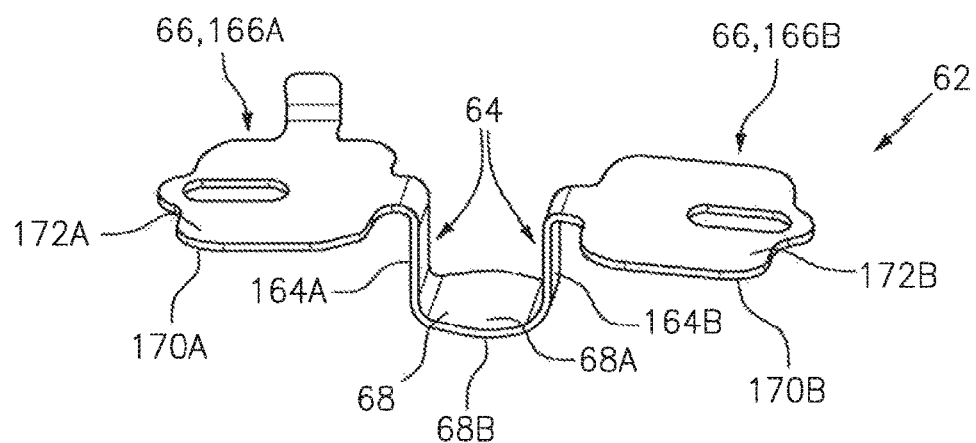
FIG. 2 is a perspective view of an airflow deflector embodiment.
Figure 3:
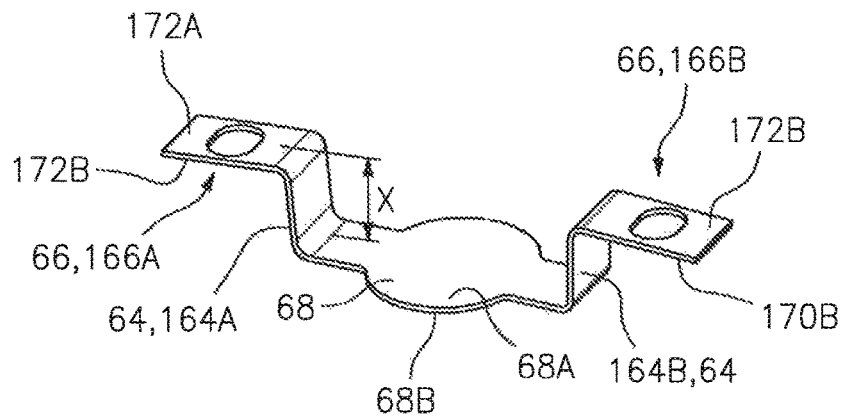
FIG. 3 is a perspective view of an airflow deflector embodiment.

FIGS. 2 and 3 show air flow deflector embodiments having a first liner attachment flange 166A, a second liner attachment flange 166B, a first deflector leg 164A, a second deflector leg 164B, and a deflector panel 68. The first liner attachment flange 166A has a bottom surface 170A and an opposite top surface 172A. The second liner attachment flange 166B has a bottom surface 170B and an opposite top surface 172B. The deflector panel 68 has an interior surface 68A and an opposite exterior surface 68B. The first deflector leg 164A extends between and is attached to the first liner attachment flange 166A and the deflector panel 68. The second deflector leg 164B extends between and is attached to the second liner attachment flange 166B and the deflector panel 68. In these particular exemplary embodiments, the respective deflector legs and liner attachment flanges are disposed on opposite sides of the deflector panel 68. The present disclosure is not limited to embodiments wherein the respective deflector legs and liner attachment flanges are disposed on opposite sides of the deflector panel 68. The deflector legs 164A, 164B maintain the deflector panel 68 a separation distance of "X" from the liner attachment flanges 166A, 166B.

Figure 4:
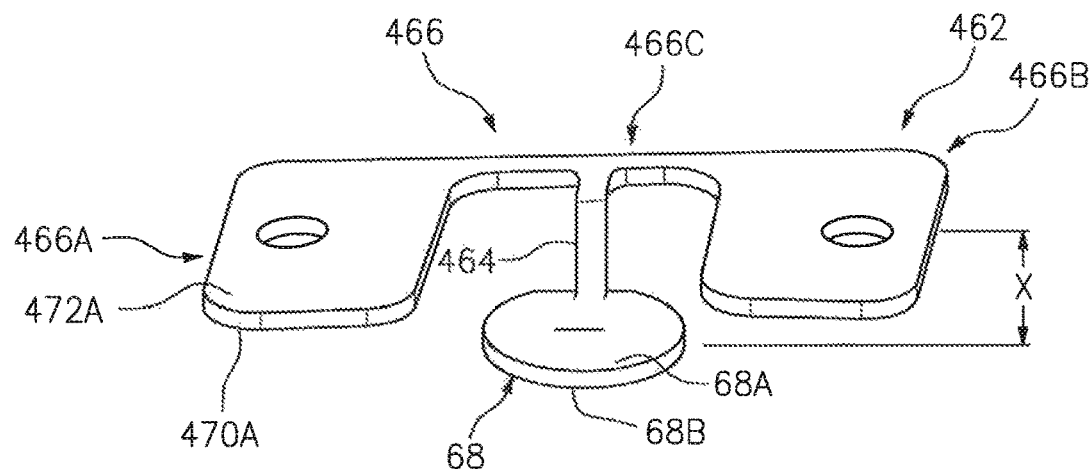
FIG. 4 is a perspective view of an airflow deflector embodiment.

FIG. 4 shows an air flow deflector 462 embodiment having a liner attachment flange 466, a deflector leg 464, and a deflector panel 68. The liner attachment flange 466 includes a first lateral portion 466A, a second lateral portion 466B, and a central portion 466C. The first and second lateral portions 466A, 466B extend laterally outwardly from the central portion 466C. The attachment flange central portion 466C and lateral portions 466A, 466B have a bottom surface 470A and an opposite top surface 472A. The deflector panel 68 has an interior surface 68A and an opposite exterior surface 68B. The deflector leg 464 extends between and is attached to the liner attachment flange 466 and the deflector panel 68. The deflector leg 464 is attached to one side of the deflector panel 68. The deflector leg 464 maintains the deflector panel 68 a separation distance of "X" from the liner attachment flange 466.

Figure 5:
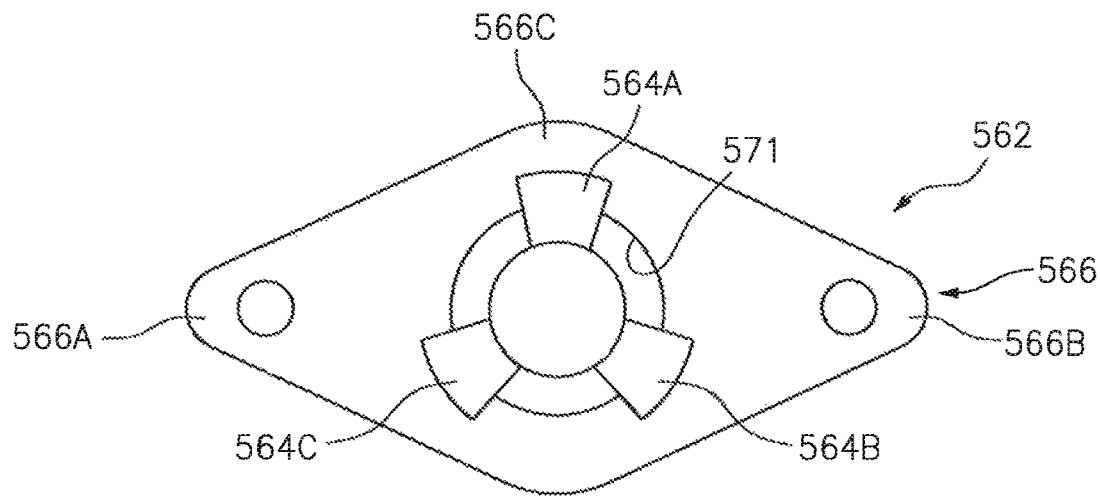
FIG. 5 is a bottom view of an airflow deflector embodiment.
Figure 5A:
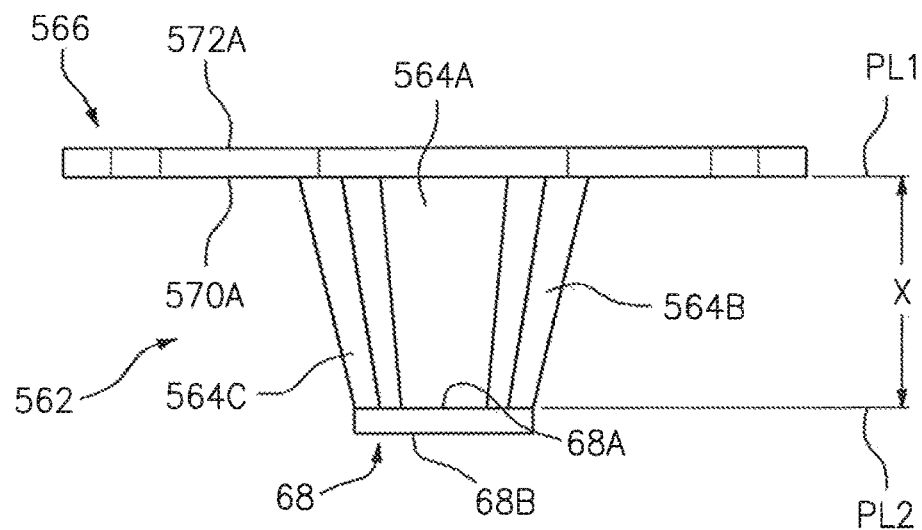
FIG. 5A is a side view of the airflow deflector embodiment shown in FIG. 5.

FIGS. 5 and 5A show an air flow deflector 562 embodiment having a liner attachment flange 566, a first deflector leg 564A, a second deflector leg 564B, a third deflector leg 564C, and a deflector panel 68. The liner attachment flange 566 includes a central portion 566C, a first lateral portion 566A, and a second lateral portion 566B. The first and second lateral portions 566A, 566B of the flange 566 extend outwardly from the central portion 566C. The central portion 566C and lateral portions 566A, 566B of the flange 566 have a bottom surface 570A and an opposite top surface 572A. In the embodiment shown, the central portion 566C and lateral portions 566A, 566B of the flange 566 are planar. The flange central portion 566C includes a center aperture 571 that extends between the bottom and top surfaces 570A, 570B. The deflector panel 68 has an interior surface 68A and an opposite exterior surface 68B. The first, second, and third deflector legs 564A, 564B, 564C extend between and are attached to the liner attachment flange 566 (e.g., at the central portion) and the deflector panel 68. The deflector legs 564A, 564B, 564C are circumferentially distributed around the flange center aperture 571. The deflector legs 564A, 564B, 564C maintain the deflector panel 68 a separation distance of "X" from the liner attachment flange 566.

The present disclosure is not limited to the above airflow deflector 62 embodiments; e.g., other embodiments may have a different number of legs, or a differently configured attachment flange, etc. Each embodiment is configured to permit the leg(s) and the deflector panel 68 to be inserted into a liner aperture 58.

The exemplary airflow deflector 62 embodiments shown in the Figures include a variety of different deflector panel 68 geometries; e.g., oblong (FIG. 2), circular (FIGS. 3-5), etc. The present disclosure is not limited to any particular deflector panel geometry. In some embodiments, a deflector panel 68 may be configured to deflect an air stream circumferentially in a substantially uniform manner (e.g., 360°). In some embodiments, a deflector panel 68 (and in some instances the attached deflector leg(s)) may be configured to deflect an air stream circumferentially for less that the entire circumference of the deflector panel 68 (e.g., 270°). In some embodiments, a deflector panel 68 (and in some instances the attached deflector leg(s)) may be configured to deflect an air stream in a particular direction to provide customized air flow control for a particular application; e.g., diffusing the air stream in a non-uniform manner, etc.

In regards to the exemplary airflow deflector 62 embodiments shown in the Figures, the deflector leg(s) are described as maintaining the deflector panel 68 a separation distance of "X" from the liner attachment flange(s). The distance "X" correlates to the distance that the airflow deflector extends beyond the liner; e.g., into the second region. The present disclosure is not limited to any particular distance "X", and the distance "X" may be varied to suit a particular application; e.g., the position of the deflector panel 68 relative to the liner can be varied to suit a particular application.

Figure 6:
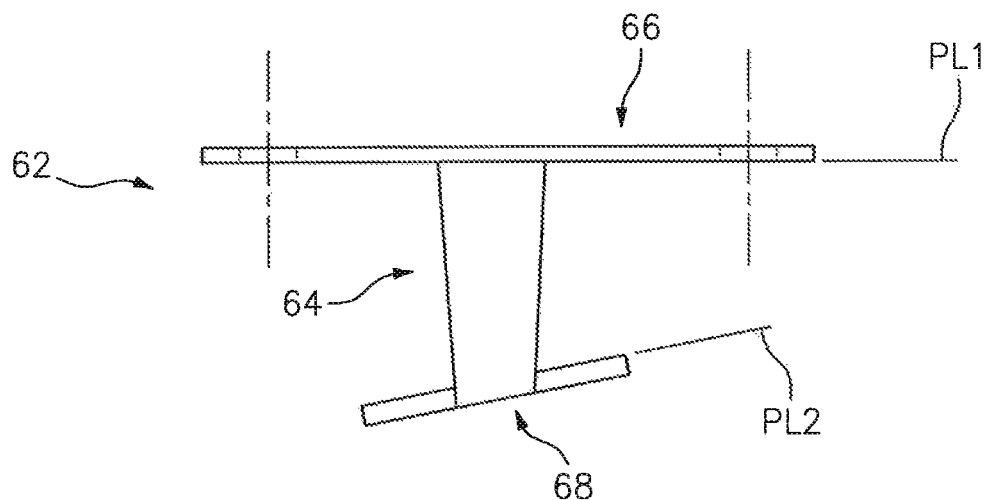
FIG. 6 is a side view of an airflow deflector embodiment.

In some embodiments, the liner attachment flange(s) may substantially reside in a first plane ("PL1") and the deflector panel 68 may substantially reside in a second plane ("PL2"). In some airflow deflector 62 embodiments (e.g., see FIG. 5A), the first and second planes are substantially parallel one another (i.e., PL1∥PL2). In some airflow deflector 62 embodiments (e.g., see FIG. 6), the deflector panel 68 may not be parallel to the liner attachment flange(s); e.g., the deflector panel 68 may be skewed relative to the liner attachment flange and/or to the direction of the impinging air flow (e.g., PL1∦PL2).

As can be seen from the exemplary airflow deflector 62 embodiments shown in FIGS. 2-6, the present disclosure airflow deflectors 62 are not limited to any particular number of deflector legs. In those embodiments where there is a plurality of deflector legs, the deflector legs may be uniformly distributed around the deflector panel 68. In other embodiments where there is a plurality of deflector legs, the deflector legs may be non-uniformly distributed around the deflector panel 68 and or may be non-uniformly configured (e.g., different size legs). Non-uniform deflector leg positioning and/or non-uniform deflector leg configurations may be used to produce a customized diffusion of the air impinging on the deflector panel 68.

Figure 7:
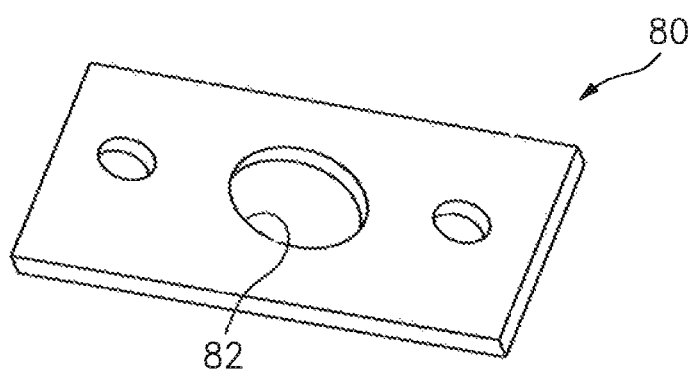
FIG. 7 is a diagrammatic perspective view of a metering plate embodiment.
Figure 8:
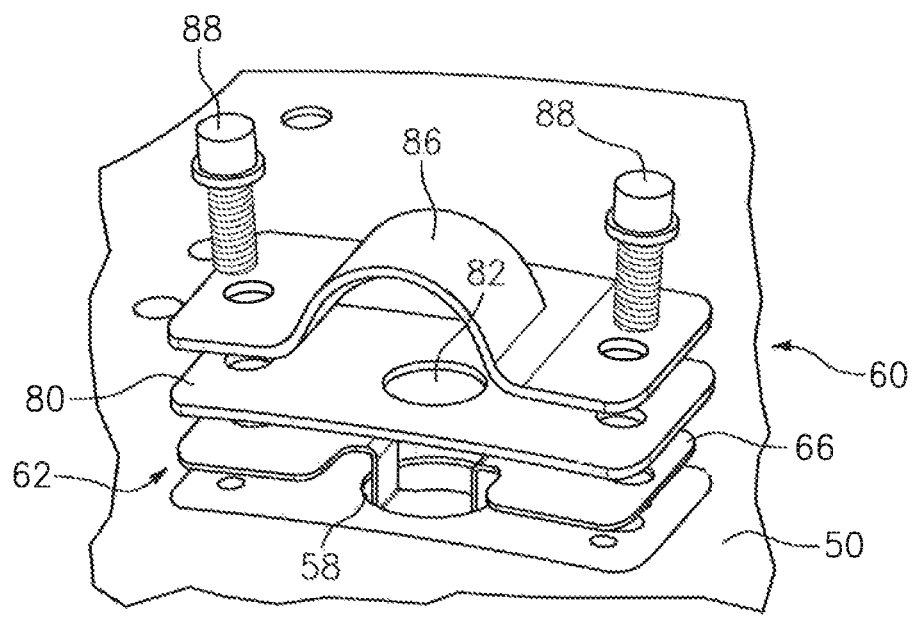
FIG. 8 is a diagrammatic exploded view of an airflow deflector embodiment mounted on a liner.

In some embodiments, an airflow deflector assembly 60 may include a metering panel 80 having a metering aperture 82 (e.g., see FIG. 7). As can be seen in FIGS. 8 and 9, the metering panel 80 may be configured to be disposed between the liner attachment flange(s) of the airflow deflector 62 and the liner 50. The geometry of the metering aperture 82 may be similar to that of the liner aperture 58 (e.g., a circular metering aperture and a circular liner aperture), but the metering aperture 82 has a cross-sectional area configuration specifically chosen to meter the airflow passing through the liner aperture 58. For example, in some embodiments, the liner aperture 58 may have a diameter D1, and the metering aperture 82 may have a diameter D2, where D1>D2. The larger diameter liner aperture 58 may be chosen to facilitate insertion of the legs and deflector panel 68 of the airflow deflector 62 through the liner 50, but may be larger than desired for purposes of controlling airflow through the liner 50. Embodiments of the present disclosure may have deflector legs 64 positioned to attach to a periphery of the deflector panel 68; e.g., spaced apart from one another by a distance that is substantially equal to the diameter of the liner aperture 58. The metering panel 80 permits the airflow passing through the liner 50 to be selectively controlled by the geometry of the metering aperture 82. During operation, a deflector 62 embodiment having a smaller diameter metering aperture 82 will produce a stream of air that is spaced apart from the deflector legs 64; e.g., the deflector legs 64 may be positioned to attach to a periphery of the deflector panel 68, separated from one another a distance that is substantially equal to the liner aperture 58, whereas the metering aperture 82 may be appreciably smaller. The combination of the airflow deflector 62 and the metering panel 80 can provide particular utility. For example, the combination of the airflow deflector 62 and the metering panel 80 can permit a designer to utilize uniform geometry liner apertures 58, and at the same time provide a plurality of airflow configurations by utilizing different combinations of airflow deflectors 62 and the metering panels 80; e.g., differently configured airflow deflectors 62, different metering panels 80 with various size metering apertures 82, etc. As another example, the combination of airflow deflectors 62 and metering panels 80 can be used to customize airflow entering a particular region in a new gas turbine engine design (e.g., directional diffusion, etc.). As yet another example, the combination of airflow deflectors 62 and metering panels 80 can be used to customize airflow in a region of an existing gas turbine engine (e.g., where liner apertures 58 already exist) as a retrofit to improve airflow diffusion performance, resolve airflow diffusion issues, etc.

Figure 7A:
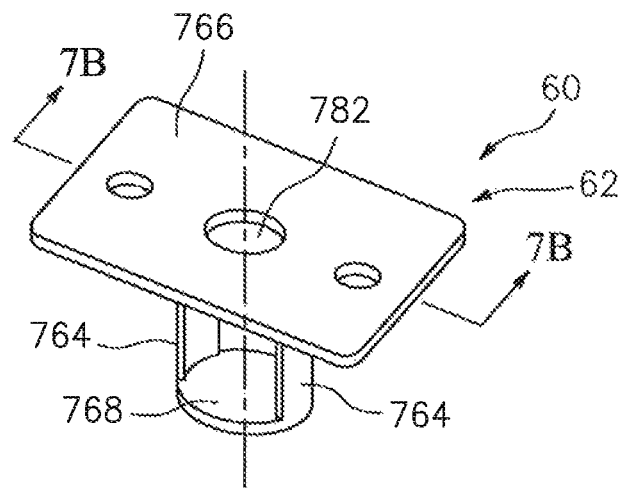
FIG. 7A is a diagrammatic perspective view of an airflow deflector embodiment having a metering orifice.
Figure 7B:
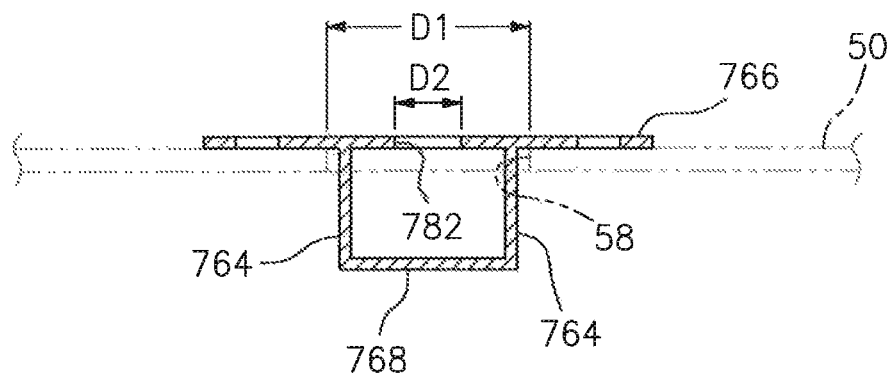
FIG. 7B is a cross-sectional view of the airflow deflector embodiment shown in FIG. 7A.

As shown in FIGS. 7A and 7B, in some airflow deflector 62 embodiments the liner attachment flange 766 may include an integrated metering aperture 782 similar to or the same as described above; e.g., a metering aperture 782 having a diameter (D2) that is less than the liner aperture 58 (D1; D2<D1).

As stated above, a liner aperture 58 may have an axis "A" that is normal to the liner 50, or it may have an axis that is not normal (i.e., disposed at an angle other than 90 degrees) relative to the liner. In some embodiments, the present disclosure airflow deflectors 62 may be configured to be received in such skewed liner apertures 58.

Figure 9:
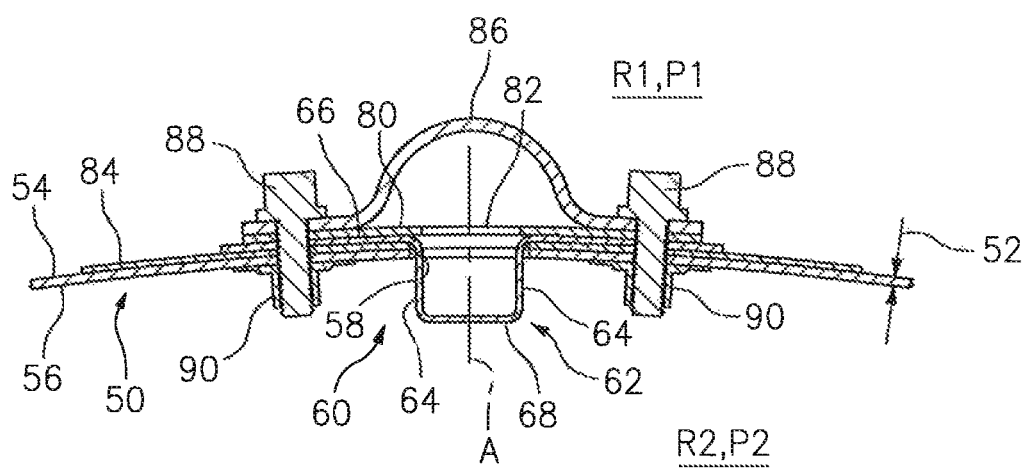
FIG. 9 is a diagrammatic sectional view of an airflow deflector embodiment mounted on a liner.

Referring to FIGS. 8 and 9, the present disclosure airflow deflector assembly 60 units are configured to be mounted on a liner 50. For purposes of explanation, the liner 50 will be described as separating a first region R1 and a second region R2 somewhere within a gas turbine engine; e.g., see FIG. 9. The present disclosure airflow deflector assembly 60 units are not limited to use in any particular section of a gas turbine engine. The liner 50 has a first surface 54 contiguous with the first region and a second surface 56 contiguous with the second region. The airflow deflector assembly 60 units are each deployed relative to a respective liner aperture 58. The airflow deflector 62 is disposed relative to the liner 50 so that the airflow deflector attachment flange(s) 66 are typically placed in contact with the first surface 54 of the liner 50. In some embodiments a gasket 84 may be used; e.g., a gasket 84 disposed between the airflow deflector attachment flange(s) 66 and the first surface 54 of the liner 50, and/or between the airflow deflector attachment flange(s) 66 and a metering panel 80, etc. When an airflow deflector 62 is mounted relative to a liner aperture 58, the deflector leg or legs 64 extend through the liner aperture 58 and extend outwardly from the second surface 56 of the liner 50. In this position, a portion of the deflector leg(s) 64 and the deflector panel 68 are disposed in the second region. In those embodiments wherein the airflow deflector assembly 60 includes a metering panel 80, the airflow metering panel 80 is disposed in contact with the airflow deflector flange(s) 66; e.g., a stacked configuration of liner 50, flange 66, and metering panel 80. In some embodiments, an air inlet panel 86 (e.g., a scoop; see FIGS. 8 and 9) may be utilized to direct air into the airflow deflector assembly 60; e.g., a stacked configuration of liner 50, flange 66, metering panel 80, and inlet panel 86. The present disclosure does not require an air inlet panel 86.

Figure 10:
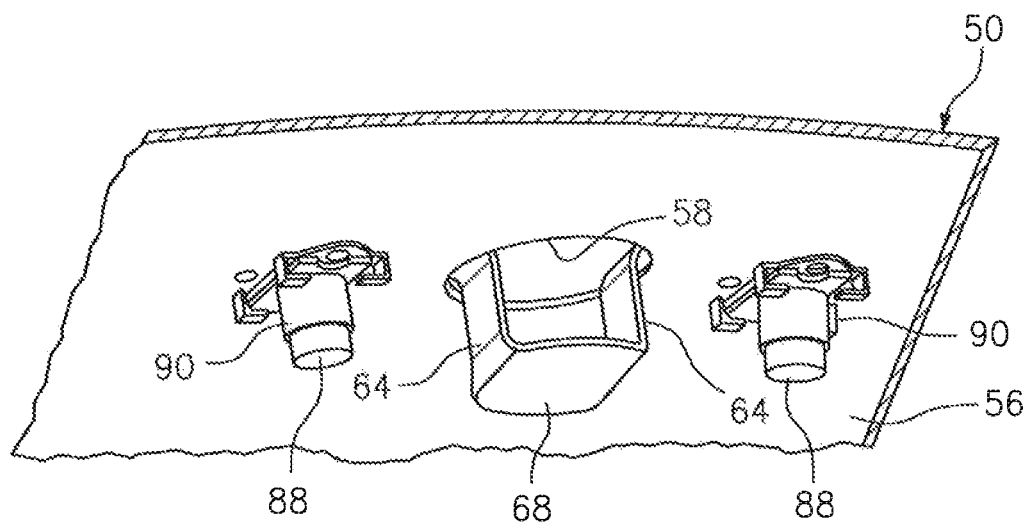
FIG. 10 is a diagrammatic perspective view of an airflow deflector embodiment mounted on a liner, shown from a second region side of the liner.

The airflow deflector assembly 60 is attached to the liner 50. The present disclosure is not limited to any particular mechanism for attaching an airflow deflector assembly 60 to the liner 50; e.g., a mechanical fastener, or bonding, or the like may be used. FIGS. 8-10 show the example of mechanical fasteners (e.g., screws 88 and clips 90) used to attach an airflow deflector assembly 60 to a liner 50.

An aspect of the present disclosure that provides particular utility is that an airflow deflector assembly 60 may be accessed, installed, replaced, etc. from one region; e.g., the first region. In some gas turbine engine applications, liner apertures 58 are used to provide cooling air from a first circumferentially extending annular region into a second circumferentially annular region, disposed radially inside of the first region. Often, the second annular region may have a narrow radial height, or difficult to access, or access requires additional disassembly of the engine. Hence, the ability to access, install, and/or replace an airflow deflector assembly 60 from the first region provides considerable utility, facilitates assembly, maintenance, and/or repair.

Figure 11:
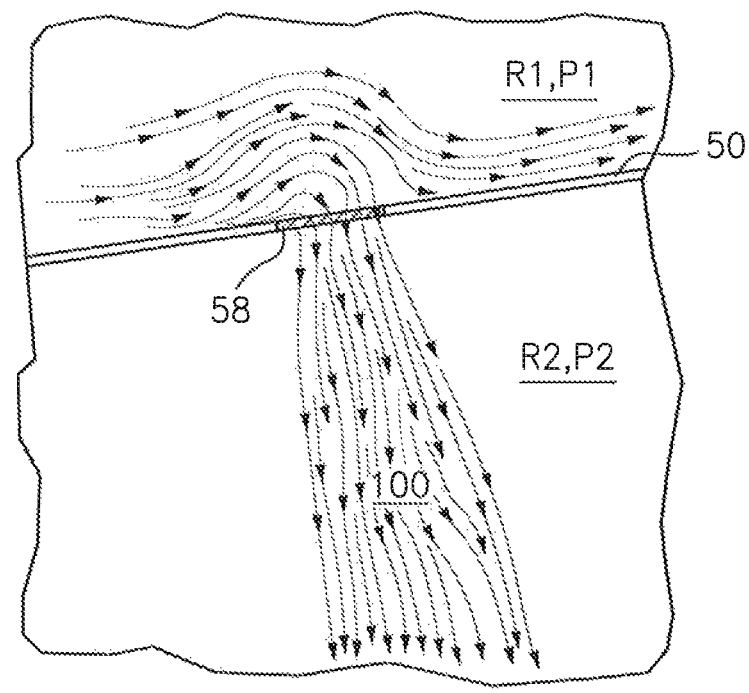
FIG. 11 is a diagrammatic depiction of fluid flow through a liner aperture with no airflow deflector assembly in use.
Figure 12:
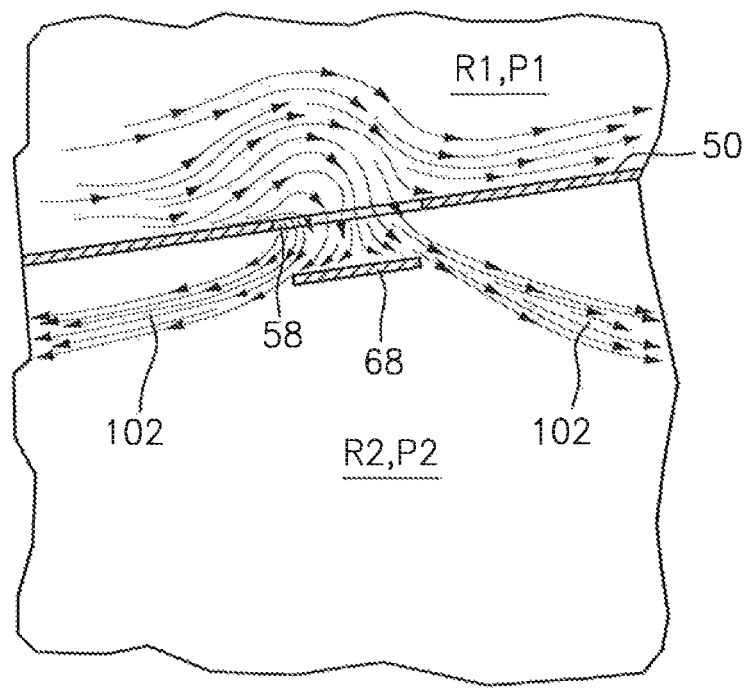
FIG. 12 is a diagrammatic depiction of fluid flow through a liner aperture with an airflow deflector assembly in use.

FIG. 11 is a diagrammatic depiction generated by a fluid flow modeling algorithm of an air flow passing through an aperture disposed in a liner 50, which liner 50 separates a first region R1 (with air at a pressure P1) from a second region R2 (with air at a pressure P2, where P1>P2) without an airflow deflector assembly 60 under conditions similar to that found in a gas turbine engine. It can be seen from FIG. 11 that air exiting the first region through the liner 50 and entering the second region forms a defined stream of air 100 within the second region, which stream of air 100 extends (e.g., radially) in a defined manner a distance from the liner 50. In contrast, FIG. 12 is a diagrammatic depiction of an air flow passing through a liner aperture 58, which liner 50 separates a first region R1 from a second region R2 (similar environmental conditions as used to produce the fluid flow in FIG. 11), with an airflow deflector assembly that includes a deflector panel 68. It can be seen from FIG. 12 that the air exiting the first region through the liner 50 and entering the second region substantially laterally diffuses (e.g., lateral streams 102) upon impingement on the deflector panel 68, thereby avoiding the defined stream of air disposed within the second region that extends a distance from the liner 50.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. An airflow deflector, comprising:
    at least one liner attachment flange, having a liner side surface and an opposing outer surface, and an airflow metering orifice;
    a deflector panel, wherein the deflector panel is non-parallel the at least one liner attachment flange; and
    at least one deflector leg extending between and attached to the at least one liner attachment flange;
    wherein the at least one deflector leg extends a distance between the deflector panel and the liner attachment flange to maintain the deflector panel a separation distance from the liner attachment flange; and wherein the airflow deflector is configured for insertion of the at least one deflector leg and the deflector panel within a liner aperture.

2. The airflow deflector of claim 1, wherein the at least one deflector leg includes a plurality of deflector legs.

3. The airflow deflector of claim 2, wherein the plurality of deflector legs are distributed around a periphery of the deflector panel.

4. The airflow deflector of claim 2, wherein the at least one liner attachment flange includes a central portion, a first portion extending laterally outward from the central portion, and a second portion extending laterally outward from the central portion.

5. An airflow deflector assembly, comprising:
   an airflow metering panel having a metering orifice;
   an airflow deflector having:
      at least one liner attachment flange, having a liner side surface and an opposing outer surface;
      a deflector panel, wherein the deflector panel is non-parallel the at least one liner attachment flange; and
      at least one deflector leg extending between and attached to the at least one liner attachment flange;
   wherein the airflow deflector assembly is configured for a stacked assembly of the airflow deflector in communication with a liner, including the insertion of the at least one deflector leg and the deflector panel within a liner aperture, and the airflow metering panel in communication with the at least one liner attachment flange with the metering orifice aligned with the liner aperture.

6. The airflow deflector assembly of claim 5, wherein the at least one deflector leg includes a plurality of deflector legs.

7. The airflow deflector assembly of claim 6, wherein the plurality of deflector legs are distributed around a periphery of the deflector panel.

8. The airflow deflector assembly of claim 6 wherein at least one liner attachment flange includes a central portion, a first portion extending laterally outward from the central portion, and a second portion extending laterally outward from the central portion;
   wherein the central portion includes an airflow aperture aligned with the metering orifice in the stacked assembly.

9. The airflow deflector assembly of claim 5 wherein the airflow metering panel is integrally formed with the airflow deflector.

\* \* \* \* \*